United States Patent Office 3,016,048
Patented Jan. 9, 1962

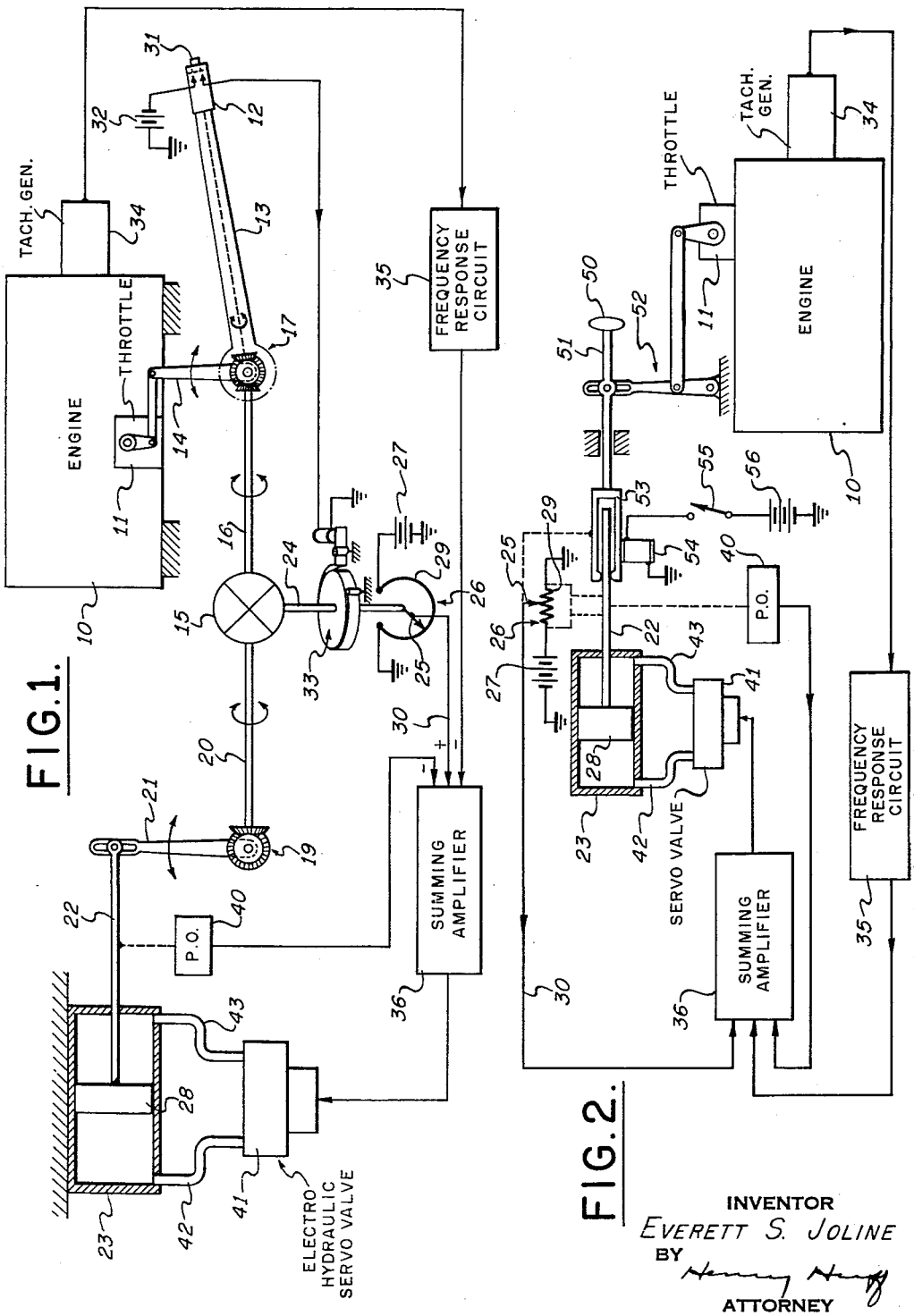

3,016,048
APPARATUS FOR MULTIPLE MODE
CONTROL SYSTEMS
Everett S. Joline, Huntington Station, N.Y., assignor to
Sperry Rand Corporation, Great Neck, N.Y., a corporation of Delaware
Filed July 13, 1960, Ser. No. 42,548
6 Claims. (Cl. 121—41)

This invention relates to synchronizing apparatus for control systems and particularly to means for synchronizing control systems having a plurality of modes of operation in order to avoid transients between one mode of operation and another wherein the synchronizing means involves a minimum of additional equipment.

In automatic control systems of the type that may be engaged and disengaged to provide automatic and manual modes of operation respectively, for example, automatic pilot, air speed control and engine speed control systems, it is frequently desirable to synchronize the reference source or command input to equal the controlled variable to avoid engage transients when the system is switched from a manual to an automatic mode of operation or vice versa. It is also desirable when the output actuating device of the system or its feedback transducer has a limited range of operation, for example, a hydraulic actuator, in order that the range of operation of the output actuating device is not constrained under certain conditions or re-engagement. For example, during manual operation of an engine speed control system, in the absence of the present invention, the manual throttle control and the piston of the hydraulic actuator may be at opposite extreme positions resulting in the capabilities of the actuator being limited in one direction by the position of the piston within the actuator or by its feedback transducer and limited in the other direction by the opposite extreme position of the manual throttle control.

In prior art control systems utilizing synchronization apparatus it is necessary to provide a separate follow-up servo loop in order to provide the necessary synchronization to avoid transients from one mode of operation to another. This follow-up servo loop added additional weight, complexity and cost to the system. The follow-up loop is eliminated by the present invention which utilizes an actuator that serves the triple purpose of operating as a primary actuator during an automatic mode of operation, as a follow-up device during a manual mode of operation, and mechanically synchronizing the throttle and the actuator.

It is a primary object of the present invention to provide synchronizing means for automatically controlled apparatus which eliminates transients between modes of operation of the system with a minimum of complexity or additional equipment.

It is an additional object of the present invention to provide synchronization apparatus in all modes of operation of an automatically controlled system that maintains the output actuating device within a range which permits unlimited operation.

These and other objects of the invention are accomplished in an engine speed control system, for example, wherein actual engine speed is sensed, and converted into an electrical signal which is subtracted from a reference speed signal. Any error therebetween is amplified and used to drive a hydraulic actuator. A brake or clutch disengageably couples the actuator to the throttle so that when engaged, as in the automatic mode of operation, the actuator will drive the throttle in a direction to reduce the speed error. The reference speed signal is obtained from a potentiometer connected differentially between the actuator and the throttle so that when the clutch is disengaged, as in the manual mode of operation, the actuator will maintain a reference speed signal equal to the actual engine speed. Only a small percentage of actuator stroke is required to compensate for the full range of the actual engine speed. The actuator closely follows the throttle position so that the limits on actuator stroke will not interfere with obtaining full throttle range.

Further objects will appear from the following specification and claims when read in conjunction with the drawings in which:

FIG. 1 schematically illustrates a preferred embodiment of the present invention as applied to a helicopter engine speed control system; and FIG. 2 schematically illustrates an alternative embodiment of the present invention as applied to a fixed wing aircraft engine speed control system.

Although the invention will be described with respect to engine speed control systems, it will be appreciated that it is equally applicable to other control systems having a plurality of modes of operation where synchronization during different modes of operation is desired.

In FIG. 1 the speed of a helicopter engine 10 is controlled by means of a throttle control means 11. In the manual mode of operation, the speed of the engine 10 is determined by rotation of the twist grip 12 of collective pitch control stick 13. The grip 12 is connected to position the throttle control linkage 14 which in turn positions the throttle control means 11 in a conventional manner.

The control stick 13 and the throttle control linkage 14 are also connected to one side of a differential 15 by means of a shaft 16, through gearing 17. Another side of the differential 15 is connected by means of a shaft 20, gearing 19 and a linkage 21 to the piston rod 22 of the piston 28 of a hydraulic actuator 23. The intermediate output member of the differential 15 is connected to a shaft 24. The slider 25 of a reference speed potentiometer 26 is mounted on an extremity of the shaft 24 for rotation therewith. The resistive winding 29 of the potentiometer 26 is fixed with respect to the helicopter frame and supplied with a suitable source of D.C. power 27 in order that rotation of the shaft 24 provides an output signal on a lead 30 connected to the slider 25 having a magnitude representative of the rotation of the shaft 24. The signal on the lead 30 from the potentiometer 26 is representative of the desired or reference engine speed as will be explained.

An engage-disengage switch 31 is mounted on the twist grip 12 and has one contact connected to a D.C. power source 32 and its other contact connected to a band brake or clutch 33. The brake 33 cooperates with the shaft 24 to permit rotation of the shaft 24 when the switch 31 is disengaged and to prevent rotation of it when the switch 31 is engaged thereby connecting the power source 32 to the brake 33.

A tachometer generator 34 is connected to be responsive to the engine speed and to provide a signal having an amplitude and a frequency representative of the actual engine speed. The tachometer generator 34 is connected to a frequency responsive circuit 35 which may be of the type disclosed in U.S. patent application 732,639 entitled, Speed Responsive System, filed May 2, 1958 in the name of H. D. Smith. The circuit 35 provides a signal having a magnitude representative of the actual engine speed to an input terminal of a summing amplifier 36. Another input terminal of the summing amplifier 36 is connected to the lead 30. A third input terminal of the summing amplifier 36 is connected to a pick-off 40 which in turn is connected to be responsive to the position of the piston rod 22 to provide a feedback signal representative of the position of the piston 28. The composite signal from the summing amplifier 36 is connected to an electrohydraulic servo valve 41 which provides a flow of pressure fluid to and from the hydraulic actuator 23 by means of conduits 42 and 43 in accordance with the composite control signal from the summing amplifier 36.

In the manual mode of operation, the switch 31 is disengaged thereby deenergizing the brake 33 and permitting the shaft 24 to rotate. Rotation of the twist grip 12 by the human pilot is transmitted through the stick 13, the gearing 17 and the linkage 14 to position the throttle control 11. The position of the throttle control 11 determines the speed of the engine 10. The rotation of the twist grip 12 also causes rotation of the shaft 16 which in turn is transmitted to the shaft 24 through the differential 15. The shaft 20 is prevented from rotating at this time by the actuator 23.

Rotation of the shaft 24 positions the slider 25 of the potentiometer 26 which provides a signal on the lead 30 to the summing amplifier 36. This signal is transmitted to the servo valve 41 which positions the piston 28 of the actuator 23 accordingly. The movement of the piston 28 is transmitted through the piston rod 22, linkage 21, gearing 19, shaft 20 and the differential 15 to cause the shaft 24 to rotate in a direction to reduce the signal from the potentiometer 26 to zero. The action described immediately above takes place very rapidly as soon as the twist grip 12 is rotated due to the fast follow-up action of the servo loop. The above action takes place prior to the time that the engine 10 achieves the revised speed dictated by the new position of the throttle control 11. During the above action, the shaft 16 is not rotated due to the action of the actuator 23 because of the relatively greater friction in the linkage 14 than that associated with the shaft 24.

As the engine 10 varies its speed in accordance with the new position of the throttle control 11, a signal representative of the actual engine speed is provided by the tachometer generator 34 to the frequency responsive circuit 35. In accordance with the teachings of the aforementioned U.S. application 732,639, a signal is provided from the frequency responsive circuit 35 to the summing amplifier 36 representative of the actual speed of the engine 10. This signal is compared in the summing amplifier 36 with the reference signal on the lead 30 from the potentiometer 26. The difference between the actual engine speed signal and the reference speed signal is an error signal that is applied to the servo valve 41 for positioning the piston 28 of the actuator 23 accordingly. The motion of the piston 28 is transmitted through the rod 22, linkage 21, gearing 19, shaft 20 and the differential 15 to rotate the shaft 24 in a direction to cause the slider 25 to arrive at a new position where the signal from the potentiometer 26 cancels the signal from the circuit 35. In this mode of operation therefore, the actuator 23 functions to position the slider 25 of the potentiometer 26 to (a) provide a new reference speed signal representative of the desired engine speed and (b) follow-up on the actual engine speed to avoid transient errors when switching from a manual to an automatic mode of operation.

The pick-off 40 provides a feedback signal representative of the position of the piston 28 to the summing amplifier 23 in opposition to the signal from the potentiometer 26 for purposes of servo stabilization.

In order to automatically maintain the engine 10 at the desired speed established by the potentiometer 26, the switch 31 is engaged thereby energizing the brake 33 from the power source 32 thereby holding the shaft 24 against rotation. In this automatic mode of operation, any change in the actual engine speed due to varying load conditions or other reasons is detected by the tachometer generator 34 which provides a signal accordingly to the circuit 35. The actual engine speed signal from the circuit 35 is compared in the summing amplifier 36 with the reference speed signal from the potentiometer 26. Any difference between the signal constitutes an error signal which actuates the servo valve 41 to position the piston 28 of the actuator 23 in a direction to return the engine speed to the reference speed. The motion of the piston 28 is transmitted through the rod 22, linkage 21, gearing 19 and the shaft 20 to the differential 15. With the shaft 24 held by the brake 33, the motion of the shaft 20 is transmitted through the differential 15 to the shaft 16 thence through the gearing 17 to the linkage 14 to the throttle control 11 and also through the stick 13 to the twist grip 12. The speed of the engine 10 is thus controlled to maintain the reference speed established by the potentiometer 26. Thus, in this mode of operation, the actuator 23 functions to position the throttle control 11 and the twist grip 12.

The pick-off 40 provides a feedback signal representative of the position of the piston 28 to the summing amplifier 23 in opposition to the signal from the potentiometer 26 for purposes of servo stabilization.

From the above description it will be appreciated that the system is maintained synchronized in the manual and automatic modes of operation in order that when switching from one mode of operation to another there are no transients tending to cause disturbance of the system. Further, it will be appreciated that the hydraulic actuator 23 serves a triple purpose, i.e., (1) in the automatic mode of operation, it positions the throttle control 11 to control the speed of the engine 10 and also the twist grip 12 to apprise the human pilot of the engine operation, (2) in the manual mode of operation, it positions the slider 25 of the potentiometer 26 to provide a new reference signal and to maintain the system synchronized, and (3) it mechanically synchronizes the throttle control 11 and the actuator 23 in order that the actuator 23 or its feedback tranducer 40 is always maintained within a range that permits unlimited operation.

An alternative embodiment of the present invention applied to the engine of a conventional fixed wing aircraft is shown in FIG. 2 wherein like reference characters indicate like elements. In FIG. 2, a manual throttle control knob 50 is connected to a throttle control shaft 51 and by means of a linkage 52 to the throttle control means 11 of the engine 10. The extremity of the shaft 51 opposite from the knob 50 has a yoke 53 through which the extremity of the piston rod 22 opposite from the piston 28 slideably protrudes. An electromagnet 54 is mounted on the yoke 53 and cooperative with the piston rod 22. The electromagnet 54 is disengageably connected through a switch 55 to a source of D.C. power 56. The resistive portion 29 of the reference potentiometer 26 is mounted on the piston rod 22 while the slider 25 thereof is connected to the yoke 53. The pick-off 40 is connected to be responsive to the movement of the piston rod 22 to provide a feedback signal representative thereof to the summing amplifier 36.

In the manual mode of operation, the switch 55 is disengaged as shown permitting relative movement between the yoke 53 and the piston rod 22. As the manual throttle control knob 50 is moved, the motion is transmitted to the shaft 51 and through the linkage 52 to the throttle control 11 which varies with speed of the engine 10 accordingly. Simultantously, this movement is transmitted through the shaft 51 and its yoke 53 to the slider 25 of the potentiometer 26. The signal from the potentiometer 26 is applied to the summing amplifier 36 and thence to the electrohydraulic servo valve 31 to position the piston 28 in a direction to reduce the signal from the potentiometer 26 to zero.

As the engine changes its speed in accordance with the movement of the knob 50, the change in engine speed is sensed by the tachometer generator 34 which provides a signal representative thereof to the frequency responsive circuit 35 and thence to the summing amplifier 36. The error signal from the summing amplifier 36 energizes the servo valve 31 to position the piston 28 of the actuator 23. The piston 28 and the resistive winding 29 which is mounted on the piston rod 22 moves relative to the yoke 53 to provide a new reference speed signal from the potentiometer 26.

In the automatic mode of operation it is desired to maintain the predetermined engine speed established as explained above. The switch 55 is closed in the automatic mode connecting the power source 56 to the electromagnet 54 thereby locking the piston rod 22 with respect to the yoke 53. In this mode of operation the actual engine speed signal from the tachometer generator 34 is transmitted to the circuit 35 thence to the summing amplifier 36. In the summing amplifier 36, the actual speed signal is compared with the reference speed signal from the potentiometer 26 and the resulting error signal actuates the servo valve 41 to position the piston 28 in a direction to reduce the error signal to zero. The movement of the piston 28 is transmitted through the piston rod 22, yoke 53 and linkage 52 for repositioning the throttle control 11 in a direction to return the engine speed to the desired reference speed. A feedback signal representative of the piston position is connected to the amplifier 36 from the pick-off 40 to stabilize the servo loop.

In the embodiment shown in FIG. 2, the system is synchronized in both modes of operation and the actuator 23 also serves a dual function.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a control system having two modes of operation, controlled means automatically controlled in one mode of operation and manually controlled in another mode of operation, manually operable means connected to said controlled means, means responsive to the operation of said controlled means for providing a control signal representative of said operation, means for providing a reference signal, means for comparing said reference signal and said control signal for providing an error signal in accordance with the difference therebetween, actuating means responsive to said error signal for providing an output in accordance therewith, said reference signal providing means having two relatively movable portions during manual operation whereby the relative position of said portions determines said reference signal, said actuating means being connected to one of said portions for controlling the movement thereof during manual operation, and securing means for preventing relative movement of the two portions of said reference signal providing means during automatic operation, said securing means including means for effectively connecting said actuating means to said controlled means and to said manually operable means during automatic operation.

2. In a control system having two modes of operation, controlled means automatically controlled in one mode of operation and manually controlled in another mode of operation, manually operable means connected to said controlled means, means responsive to the operation of said controlled means for providing a control signal representative of said operation, means for providing a reference signal, means for comparing said reference signal and said control signal for providing an error signal in accordance with the difference therebetween, actuating means responsive to said error signal for providing an output in accordance therewith, differential means having a first shaft connected to said actuating means, a second shaft connected to said controlled means and said manually operable means, and a third shaft connected to control said reference signal providing means, and securing means for selectively securing said third shaft during automatic operation and releasing it during manual operation whereby said actuating means performs the dual function of controlling said controlled means during automatic operation and controlling said reference signal providing means during manual operation.

3. In a control system having two modes of operation, controlled means automatically controlled in one mode of operation and manually controlled in another mode of operation, manually operable means connected to said controlled means, means responsive to the operation of said controlled means for providing a control signal representative of said operation, means for providing a reference signal, means for comparing said reference signal and said control signal for providing an error signal in accordance with the difference therebetween, actuating means responsive to said error signal for providing an output in accordance therewith, said reference signal providing means having two portions, one portion being effectively mounted on said actuating means and the other portion being effectively mounted on said controlled means, and means for selectively securing said actuating means to said controlled means during automatic operation whereby during automatic operation the relatively movable portions of said reference signal providing means are maintained fixed with respect to each other and said actuating means drives said controlled means, and during manual operation said portions are movable relative to each other in accordance with the movement of said actuating means for providing a new reference signal.

4. In a control system having a plurality of modes of operation, controlled means, manually operable means drivably connected to said controlled means, first signal generating means responsive to the operation of said controlled means for providing a control signal representative of the actual operation of said controlled means, second signal generating means for providing a reference signal representative of the desired operation of said controlled means, means for comparing said reference signal and said control signal for providing an error signal in accordance with the difference therebetween, actuating means responsive to said error signal for providing an output in accordance therewith, said second signal generating means having two relatively movable portions during manual operation whereby the relative position of said portions determines said reference signal, said actuating means being connected to one of said portions for controlling the movement thereof during manual operation, and means for preventing relative movement of the two portions of said reference signal providing means during automatic operation including means for effectively connecting said actuating means to said controlled means and said manually operable means during automatic operation.

5. A system of the character described in claim 4 including differential means having a first shaft connected to said actuating means, a second shaft connected to said controlled means and said manually operable means and a third shaft connected to control one portion of said second signal generating means, and means for selectively securing said third shaft during automatic operation and releasing it during manual operation whereby said actuating means performs the dual functions of controlling said controlled means during automatic operation and controlling said second signal generating means during manual operation.

6. A system of the character described in claim 4 wherein one portion of said second signal generating means is mounted on said actuating means and the other portion is connected to said controlled means, and means for selectively securing said actuating means to said controlled means whereby during automatic operation said portions are fixed with respect to each other and said actuating means drives said controlled means and during manual operation said portions are movable relative to each other in accordance with the movement of said actuating means for establishing a reference signal.

References Cited in the file of this patent

UNITED STATES PATENTS

| | | |
|---|---|---|
| 2,358,363 | Truesdell | Sept. 19, 1944 |
| 2,496,294 | Kellogg | Feb. 7, 1950 |
| 2,640,551 | Plumb | June 2, 1953 |
| 2,685,871 | Block | Aug. 10, 1954 |